US012679402B2

(12) United States Patent
Khamis et al.

(10) Patent No.: US 12,679,402 B2
(45) Date of Patent: Jul. 14, 2026

(54) ADAPTIVE ALERTING AND MULTIMODAL CONVERSATIONAL HMI FOR ASSISTED AND AUTOMATED DRIVING SYSTEMS

(71) Applicant: GM GLOBAL TECHNOLOGY OPERATIONS LLC, Detroit, MI (US)

(72) Inventors: Alaa M. Khamis, Courtice (CA); Brandon Alan Schoettle, Farmington Hills, MI (US); Yi Guo Glaser, Novi, MI (US); Steffen Peter Lindenthal, Oshawa (CA); Michael D. Alarcon, Markham (CA); Steven Landry, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 18/741,069

(22) Filed: Jun. 12, 2024

(65) Prior Publication Data

US 2025/0381978 A1      Dec. 18, 2025

(51) Int. Cl.
*B60W 50/16*      (2020.01)
*B60W 30/182*     (2020.01)
*B60W 40/08*      (2012.01)
*G06F 40/00*      (2020.01)
*B60W 50/00*      (2006.01)
*B60W 50/14*      (2020.01)

(52) U.S. Cl.
CPC .......... *B60W 50/16* (2013.01); *B60W 30/182* (2013.01); *B60W 40/08* (2013.01); *G06F 40/00* (2020.01); *B60W 2040/0818* (2013.01); *B60W 2050/0083* (2013.01); *B60W 2050/143* (2013.01); *B60W 2050/146* (2013.01); *B60W 2540/223* (2020.02); *B60W 2540/225* (2020.02); *B60W 2540/229* (2020.02)

(58) Field of Classification Search
CPC .... B60W 50/16; B60W 30/182; B60W 40/08; B60W 2040/0818; B60W 2050/0083; B60W 2050/143; B60W 2050/146; B60W 2540/223; B60W 2540/225; B60W 2540/229; G06F 40/00
USPC ...................................................... 340/425.5
See application file for complete search history.

(56) References Cited

U.S. PATENT DOCUMENTS

| | | | | |
|---|---|---|---|---|
| 9,956,963 B2 * | 5/2018 | Vijaya Kumar | ...... | B60W 40/08 |
| 11,081,109 B2 * | 8/2021 | Chae | ........................ | G10L 15/26 |
| 11,718,314 B1 * | 8/2023 | Nallani | .................. | B60Q 9/008 |
| | | | | 340/903 |
| 2019/0129416 A1 * | 5/2019 | Upmanue | ............ | G05D 1/0061 |

(Continued)

*Primary Examiner* — Omar Casillashernandez

(57)      ABSTRACT

An assisted driving system of a host vehicle includes: an adaptive alert module configured to adaptively generate alerts having variable duration and intensity; a multimodal conversational interface module configured to implement a large language model to have a conversation with an occupant of the host vehicle using a plurality of modalities; and an assisted driving module configured to operate in an assisted driving mode, and while in the assisted driving mode, perform a plurality of precondition checks to enable at least one of i) the adaptive alert module to operate in an adaptive alert mode and provide the alerts via a human machine interface (HMI) of the host vehicle, and ii) the multimodal conversational interface module to perform a multimodal conversation with the occupant via the HMI.

18 Claims, 11 Drawing Sheets

(56)        References Cited

U.S. PATENT DOCUMENTS

2022/0153282 A1*   5/2022  Matthias  ................... G06T 7/20
2024/0202854 A1*   6/2024  Beaurepaire  ......... G06Q 50/265
2024/0412720 A1*  12/2024  Vasylyev  .......... G06F 16/90332
2025/0029488 A1*   1/2025  Zahid  ................. H04W 64/003

* cited by examiner

FIG. 7

ADAPTIVE ALERTING AND MULTIMODAL CONVERSATIONAL HMI FOR ASSISTED AND AUTOMATED DRIVING SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to assisted and automated driving systems.

Vehicles can have assisted and automated driving systems, which are implemented to aid a driver or vehicle occupant in driving a vehicle. As an example, a vehicle can have a hands-free driving system that controls steering, braking, and accelerating operations during at least a portion of a trip. During hands-free driving, a driver is not controlling driving operations but may intervene should the driver disagree with an action being performed by the vehicle. This may occur, for example, by the driver tapping on a brake pedal or gas pedal and taking over control of vehicle steering, braking and accelerating operations.

SUMMARY

An assisted driving system of a host vehicle is disclosed. The assisted driving system includes: an adaptive alert module configured to adaptively generate alerts having variable duration and intensity; a multimodal conversational interface module configured to implement a large language model to have a conversation with an occupant of the host vehicle using modalities; and an assisted driving module configured to operate in an assisted driving mode, and while in the assisted driving mode, perform precondition checks to enable at least one of i) the adaptive alert module to operate in an adaptive alert mode and provide the alerts via a human machine interface (HMI) of the host vehicle, and ii) the multimodal conversational interface module to perform a multimodal conversation with the occupant via the HMI.

In other features, the assisted driving mode includes the assisted driving module controlling steering, acceleration and deceleration of the host vehicle.

In other features, the assisted driving system further includes an in-context active learning module configured to fine tune the large language model of the multimodal conversational interface module.

In other features, the adaptive alert module is configured to adaptively change duration and intensity of alerts provided to the occupant based on multiple parameters.

In other features, the adaptive alert module is configured to adaptively change duration and intensity of alerts based on an inattentiveness level of the occupant and an imminence of a potential threat level.

In other features, the adaptive alert module is configured to adaptively change duration and intensity of alerts based on detected posture and gaze of the occupant.

In other features, the multimodal conversational interface module is configured to at least one of alert and provide messages to the occupant using the modalities. The modalities include an audio device, a display, a haptic device, and one or more lights.

In other features, the multimodal conversational interface module is configured to control at least one of ambient lighting, interior lighting, and an audio system to direct focus of the occupant to a certain point or area of interest.

In other features, the certain point or the area of interest refers to a display or an area forward of the host vehicle.

In other features, the multimodal conversational interface module is configured to control illumination light bars in an interior of the host vehicle to direct the occupant to the certain point or area of interest.

In other features, the multimodal conversational interface module is configured to redirect focus of the occupant to a center of a road ahead of the host vehicle and reengage assisted driving.

In other features, the multimodal conversational interface module is configured to display a spatial constellation related to decision making on a display.

In other features, the multimodal conversational interface module is configured to generate reactive and proactive messages for the occupant, the reactive and proactive messages being context based and domain specific.

In other features, the multimodal conversational interface module is configured to answer questions from the occupant regarding the assisted driving mode.

In other features, the assisted driving system further includes an in-context active learning module configured to update a personal profile of the occupant. The adaptive alert module is configured to adaptively generate alerts based on the personal profile.

In other features, the multimodal conversational interface module is configured to i) receive explicit feedback and detect implicit feedback from the occupant regarding the alerts, and ii) generate rewards based on the explicit feedback and the implicit feedback. The adaptive alert module configured to change an alert strategy for the occupant based on the rewards.

In other features, an assisted driving method for a host vehicle is disclosed. The method includes: operating in an assisted driving mode; while operating in the assisted driving mode, perform precondition checks to enable an adaptive alert mode and to enable a multimodal conversation with an occupant of the host vehicle. During the adaptive alert mode, alerts are adaptively generated having variable duration and intensity and the alerts are provided via a human machine interface (HMI) of the host vehicle. During the multimodal conversation, a large language model is implemented to have a conversation with the occupant using modalities via the HMI.

In other features, the assisted driving method further includes controlling via a control module of the host vehicle steering, acceleration and deceleration of the host vehicle while operating in the assisted driving mode.

In other features, the assisted driving method further includes: fine tuning the large language model based on preferences of the occupant; and changing an alert strategy including changing duration and intensity of one or more of the alerts for the occupant based on the finely tuned large language model and multiple parameters.

In other features, the assisted driving method further includes providing the alerts using selectively the modalities based on a personal profile of the occupant.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is an example plot illustrating durations and intensities of alerts based on inattentiveness and imminence of potential threats in accordance with the present disclosure;

In the drawings, reference numbers may be reused to identify similar and/or identical elements.

DETAILED DESCRIPTION

Figure 1:
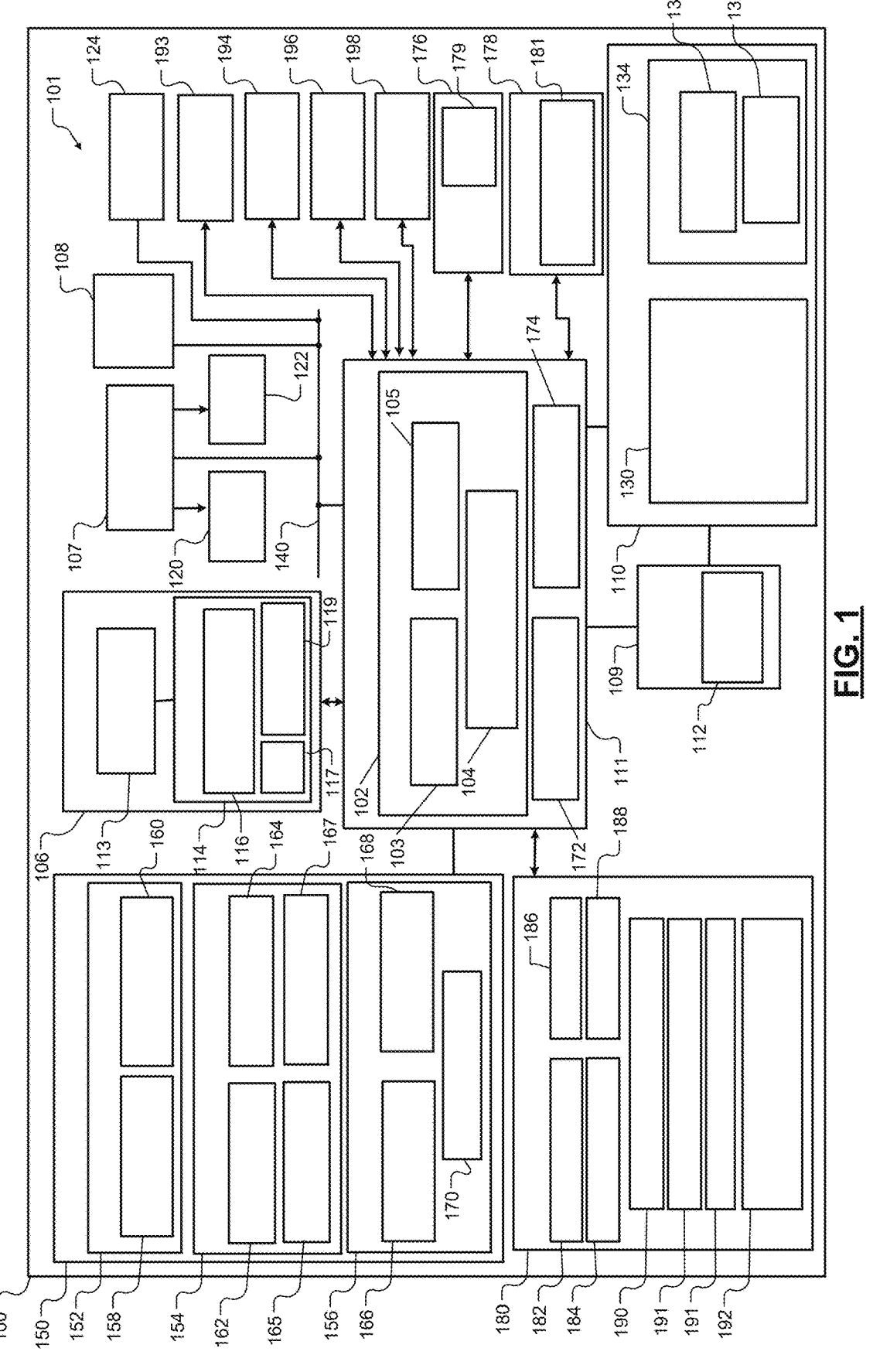
FIG. 1 is a functional block diagram of a host vehicle including an example driver automation system (DAS) with an assisted driving module in accordance with the present disclosure.

A hands-free driving system can control steering, braking and accelerating of a host vehicle when engaged. A driver or vehicle occupant can disengage hands-free (sometimes referred to as assisted or automated) driving by, for example, tapping on a brake pedal or an accelerator pedal. Traditional hands-free driving systems have limited triggers for engaging and disengaging hands-free driving, limited or no interaction with a vehicle occupant, and limited functionality.

The examples disclosed herein include driving automation systems with assisted and/or automated driving including adaptive alerting, multimodal conversational interfacing, and in-context active leaning. The examples are applicable to at least level 2, level 2.5 and level 3 automation. The examples are applicable to assisted and automated driving with human supervision and intervention to take over control and disengage assisted and automated driving. The examples include adaptive levels of disengagement including adaptive duration and intensity of alerting. For example, duration and intensity of an alert may be based on how far away a host vehicle is being steered away from a center of a current driving lane. As another example, the duration and intensity of an alert may be based on how attentive a vehicle occupant is (e.g., is the vehicle occupant turning his or her head slightly or is the vehicle occupant turning around and not paying attention to the road ahead). The source location or modality of the alert may be adapted based on driver disposition or secondary task type. The alerts may be provided to indicate to the vehicle occupant to be attentive to one or more conditions and/or to take over driving control.

The multimodal conversational interfacing includes interfacing with a vehicle occupant visually via one or more displays and/or lights, audibly via speakers and/or other audible devices, and haptically via haptic devices. The interfacing is domain specific meaning the interfacing (or communicating) with the occupant is related to driving and/or vehicle operations. The domain specific interfacing includes reactive and proactive interfacing and may include a multimodal conversational agent and use of a large language model (LLM). In an embodiment, in-context active leaning is performed to train the LLM and enhance and improve multimodal interfacing, which includes use of a multimodal conversational human machine interface (HMI), as further described below. These and other adaptive alerting, multimodal conversation interfacing, and in-context active learning are further described below.

When driving in open spaces, a driver may want to relax and gaze at nature and scenery while driving. The driver may for this reason engage hands-free driving associated with the 2.5 automation level. This type of automated driving only works on mapped roads and requires the driver to keep their eyes on the road, except for a maximum of 10 second breaks. The disclosed examples provided herein enable adaptive alerting, a multimodal conversational HMI and in-context active learning after checking a number of preconditions and taking into account driving posture.

FIG. 1 shows a host vehicle 100 including a driving automation system (DAS) 101 with an assisted driving module 102. The assisted driving module 102 includes an adaptive alert module 103, a multimodal conversational interface module 104 and an in-context active learning module 105. Although shown as separate modules, two or more of the modules 102, 103, 104, 105 may be combined and implemented as a single module. The adaptive alert module 103 performs adaptive alerting as described herein. The multimodal conversational interface module 104 conducts reactive and proactive interfacing with a vehicle occupant as described herein. The in-context active learning module 105 performs in-context active learning as described herein.

A portion of the DAS 101 is shown in FIG. 1 and additional details of the DAS are shown in FIGS. 2, 3, and 9-10. The host vehicle 100 includes a vehicle control module 111, which as shown includes the assisted driving module 102. The assisted driving module 102 performs: perception (or situation) determining operations; object detection, identification, classification, and graphical and visual identification operations; data look-up, collection, and gathering operations; interaction timing operations; assisted driving operations; image overlay operations; dialog operations including providing speech, text, and/or haptic messages; etc. The vehicle control module 111 may perform various operations based on the interaction with the user and the messages, generated as further described below.

The host vehicle 100 further includes one or more power sources 109, a telematics module 106, an infotainment module 107, other control modules 108 and a propulsion system 110. The vehicle control module 111 may control operation of the vehicle 100 including the propulsion system 110. The power sources 109 may include one or more battery packs, a generator, a converter, a control circuit, terminals for high and low voltage loads, etc., as well as one or more battery sensors 112 for detecting states of the power sources 109 including voltages, current levels, states of charge, etc.

The telematics module 106 provides wireless communication services within the host vehicle 100 and wirelessly communicates with service providers, network devices, other vehicles, mobile devices, infrastructure devices, and other devices external and/or internal to the host vehicle 100. The telematics module 106 may support Wi-Fi®, Bluetooth®, Bluetooth Low Energy (BLE), Ultra Wideband (UWB), near-field communication (NFC), cellular, legacy (LG) transmission control protocol (TCP), long-term evolution (LTE), and/or other wireless communication and/or operate according to Wi-Fi®, Bluetooth®, BLE, UWB, NFC, cellular, and/or other wireless communication protocols. The telematics module 106 may include one or more transceivers 113 and a navigation module 114 with a global positioning system (GPS) and GNSS (or Global Navigation Satellite System) receiver 116. The navigation module 114 may include an inertial measurement unit (IMU) 117 and an odometer/wheel sensor 119. The transceivers 113 wirelessly communicate with network devices internal and external to the host vehicle 100 including cloud-based network devices, central stations, back offices, and portable network devices. The transceivers 113 may perform pattern recognition, channel addressing, channel access control, and filtering operations.

The navigation module 114 executes a navigation application to provide navigation services. The navigation services may include location identification services to identify where the host vehicle 100 is located. The navigation services may also include guiding a driver and/or directing the host vehicle 100 to a selected location. The navigation module 114 may communicate with a central station to collect map information indicating levels of traffic, transportation object identification and locations (e.g., locations and types of signs), path information, where rest areas are located, where gas stations are located, where restaurants are located, etc. As an example, if the host vehicle 100 is an assisted and/or automated driving vehicle, the navigation module 114 may direct the vehicle control module 111 along a selected route to a selected destination. The GPS and GNSS receiver 116 may provide vehicle velocity and/or direction (or heading) of the host vehicle 100 and other vehicles and objects (e.g., pedestrians and cyclists) and/or global clock timing information.

The infotainment module 107 may include and/or be connected to an audio system 122 and/or a video system including one or more displays (one display 120 is shown). The displays 120 and audio system 122 may be part of a human machine interface. The displays 120 may include cluster and/or center console displays, head-up displays, etc. Haptic devices 124 (e.g., steering wheel and/or seat vibration devices) may be used in addition to the displays and the audio system 122 to interact with a vehicle occupant such as a driver or passenger. This interaction is further described below. Messages may be displayed, audibly played out, and/or indicated via the displays 120, the audio system 122, the haptic devices 124, and/or via one or more other output devices.

The infotainment module 107 may provide various informative, warning, and proactive messages including information regarding: upcoming and currently being performed operations (e.g., braking, accelerating, turning operations), detected objects (or obstacles); upcoming and/or nearby gas stations, upcoming and/or nearby restaurants, music services, upcoming and/or nearby shops, vehicle status information, diagnostic information, prognostic information, entertainment features, etc. The infotainment module 107 may be used to guide a vehicle operator to a certain location, indicate trip estimations (e.g., distances to selected destinations), and other information.

The propulsion system 110 may include one or more torque sources, such as one or more motors and/or one or more engines (e.g., internal combustion engines). In the example shown in FIG. 1, the host vehicle 100 includes an engine 130 and one or more motors 132. The torque sources are independently controlled. The propulsion system 110 includes a motor control system 134 that includes the one or more motors 132 and a motor control module 136 that may control operation of the one or more motors 132 based on signals from the vehicle control module 111.

The modules 103, 104, 107, 108, 111 may communicate with each other via one or more buses 140, such as a controller area network (CAN) bus and/or other suitable interface. The vehicle control module 111 may control operation of vehicle modules, devices and systems based on feedback from sensors 150.

The sensors 150 may include exterior sensors 152, interior sensors 154, and other sensors 156. The exterior sensors 152 may include radar and/or lidar sensors 158 and imaging and audio devices (e.g., visual spectrum cameras, long-wave infrared cameras, short-wave infrared cameras, ambient light sensors, and microphone or microphone array) 160. The exterior sensors 152 may be used to detect objects external to the host vehicle 100 and/or in a path of the host vehicle 100.

The interior sensors 154 may include interior imaging sensors (e.g., cameras) 162, a microphone or microphone array 164, one or more imaging radar sensors 165, and one or more laser scanning sensors 167. The interior sensors 154 may be part of a driver monitoring system (DMS). The interior sensors 154 may be used to monitor a vehicle occupant to detect and track head locations and/or eyes. Location and movement of vehicle occupant head and eyes may be tracked. As an example, the interior sensors 154 may track posture, arm and hand locations, and eyes of a driver. This includes determining eye locations and eye gaze direction, detecting gestures made by the driver, detecting orientation of a body of the driver, detecting speech of the driver, etc. This monitoring may be used to determine in which directions the driver is looking, what object(s) the driver is looking at, etc.

The other sensors 156 may include a vehicle speed sensor 166, acceleration sensors (e.g., longitudinal and lateral acceleration sensors) 168, and a fuel level sensor 170, as shown, and other sensors such as an inclinometer, an engine temperature sensor and an engine oil pressure sensor. Additional sensors may also be included such as brake system sensors (a brake sensor 179 is shown) and steering system sensors (a steering angle sensor 181 is shown).

The assisted driving module 102 may use machine learning for object classification including to identify and/or classify pedestrians, cyclists, and vehicles (e.g., oncoming traffic), as well as for probable trajectory determination of each detected, identified and/or classified object. The assisted driving module 102 may determine the locations of objects based on feedback from the sensors 150. The assisted driving module 102 may also detect driver (or occupant) head and eye position and gaze angle, which may be used to calculate and continually adjust the location of projected conformal graphics overlaid on the roadway in real-time. The graphics include digital gateways, object identifiers, and other displayed information.

The vehicle control module 111 may also include a mode selection module 172 and a parameter adjustment module 174. The mode selection module 172 may select a vehicle operating mode. The parameter adjustment module 174 may be used to adjust parameters of the host vehicle 100. The vehicle control module 111 may perform autonomous operations based on interaction with a vehicle occupant. As an example, the vehicle control module 111 may operate in a fully or partially autonomous mode and may control the propulsion system 110, a brake system 176, and a steering system 178. In an embodiment, the vehicle control module 111 controls operation of the systems 110, 176 and 178 based on interactions with a vehicle occupant. The vehicle control module 111 may i) perform autonomous operations such as steering, braking, accelerating, etc., and/or ii) display and/or audibly playout messages, perform haptic operations via haptic devices 124, and/or output messages and/or corresponding signals via other output devices.

In an embodiment, the DAS 101 uses computer vision, machine learning and cloud computing to identify, communicate, and evaluate scenarios where a moving host vehicle should yield to pedestrian(s), an obstructed roadway, and/or oncoming (right-of-way) traffic. The DAS 101 visualizes and takes into consideration in real-time pedestrians, roadway obstructions and oncoming traffic and performs operations to provide enhanced situation awareness to vehicle occupants. The DAS 101 provides situation awareness in automated driving modes to increase user trust and aid in vehicle take-over.

In an embodiment, a vehicle occupant (e.g., driver or passenger) may manually override operations performed by the DAS 101. This may include, for example, steering, braking and/or accelerating operations being performed. This may be done by, for example, gently tapping on the brake or the accelerator to partially or fully disengage the DAS 101. The DAS 101 is configured to perceive the road ahead and surrounding areas based on outputs of sensors (e.g., cameras, radar sensors, and/or lidar sensors) and vehicle-to-everything (V2X) communication including vehicle-to-vehicle communication, vehicle-to-mobile device communication, vehicle-to-infrastructure communication, and other communication (e.g., vehicle to distributed network communication).

The host vehicle 100 may further include the memory 180. The memory 180 may store sensor data 182, parameters 184, applications 186, algorithms 188, historical data 190, a domain specific LLM 191, off-board inputs 191 from other devices external to the host vehicle 100 and other data 192. The parameters may include sensor parameters such as vehicle speed, vehicle acceleration, battery state of charge, fuel level, etc. applications 186. The applications 186 may include applications executed by the modules 102, 103, 104, 105, 107, 108, 111.

Although the memory 180 and the vehicle control module 111 are shown as separate devices, the memory 180 and the vehicle control module 111 may be implemented as a single device. The memory 180 may also store historical data 190 and other data 192 such as driver driving patterns, driver fueling patterns, driver stopping patterns, driver pickup patterns, other driver patterns, data collected by and/or generated by at least one of the modules 102, 111, traffic data, navigation data, map data, GPS data, path data, speed data, and acceleration data, etc.

The vehicle control module 111 may control operation of the propulsion system 110, the video system including the display 120, the audio system 122, the haptic devices 124, the brake system 176, the steering system 178, a heating ventilation and air-conditioning (HVAC) system 193, a lighting system 194, a seating system 196, a mirror system 198, and/or other devices and systems according to parameters set by the modules 102, 107, 108, 111, 174. The vehicle control module 111 may set at least some of the parameters based on signals received from the sensors 150. The lighting system 194 may include various interior lights, series of light emitting diodes (LEDs), light bars, etc. The lighting system 194 may also include and/or control the amount of ambient light entering the vehicle by adjusting tint levels of windows, opening and/or closing one or more shades, etc.

The vehicle control module 111 may receive power from the power sources 109, which may be provided to the propulsion system 110, the brake system 176, the steering system 178, a HVAC system 193, the lighting system 194, the seating system 196, the mirror system 198, etc. Power supplied to the haptic devices 124, the motors 132, the brake system 176, the steering system 178, a HVAC system 193, the lighting system 194, the seating system 196, the mirror system 198, and/or actuators thereof may be controlled by the vehicle control module 111 to, for example, adjust: motor speed, torque, and/or acceleration; braking pressure; steering wheel angle; pedal position; state of haptic devices 124; etc. This control may be based on the outputs of the sensors 150, the navigation module 114, the GPS and GNSS receiver 116, the data and information received from external devices, and the data and information stored in the memory 180.

The vehicle control module 111 may determine various parameters including a vehicle speed, a motor speed, a gear state, an accelerator position, a brake pedal position, an amount of regenerative (charge) power, an amount of auto start/stop discharge power, and/or other information. The vehicle control module 111 may control operations of the systems 110, 176, 178 based on the stated parameters. The assisted driving module 102 may display vehicle status information based on the stated parameters.

The assisted driving module 102 monitors real-time behavior of vehicle occupants including speech, gaze patterns, head positions, gestures (e.g., hand gestures, finger gestures, facial gestures, etc.). Gaze patterns include directions of an occupant's head and eyes. This information is used to determine where, how, duration, timing, and intensity of alerts and other conversational messages.

The host vehicle 100 can include various systems for assisting a driver, for performing autonomous operations, and/or for indicating to a vehicle occupant information regarding an environment of the host vehicle. For example, a host system may include a navigation system that provides map information indicating lane boundaries, street locations, speed limits, geographical locations of selected destinations, etc. The host system may provide the driver with instructions for driving to a selected destination and/or may perform autonomous operations such as braking, steering and accelerating operations to drive the vehicle to the destination based on the map information.

As another example, the host vehicle 100 may include object detection and collision warning systems for detecting impending objects and performing countermeasures and/or taking evasive action to prevent a collision. The vehicle control module 111 determines locations of the objects relative to the host vehicle 100 and trajectories of the objects and the host vehicle 100. If it is determined that the host vehicle 100 is likely to collide with one of the objects, one or more warning signals may be generated to indicate to the driver and/or the object of concern of the potential collision. These warnings may be provided in addition to digital gateways and other information described herein. The vehicle control module 111 may also or alternatively perform one or more other countermeasures (e.g., apply brakes to decelerate the host vehicle, change a steering angle of the host vehicle, etc.) to prevent a collision.

Figure 2:
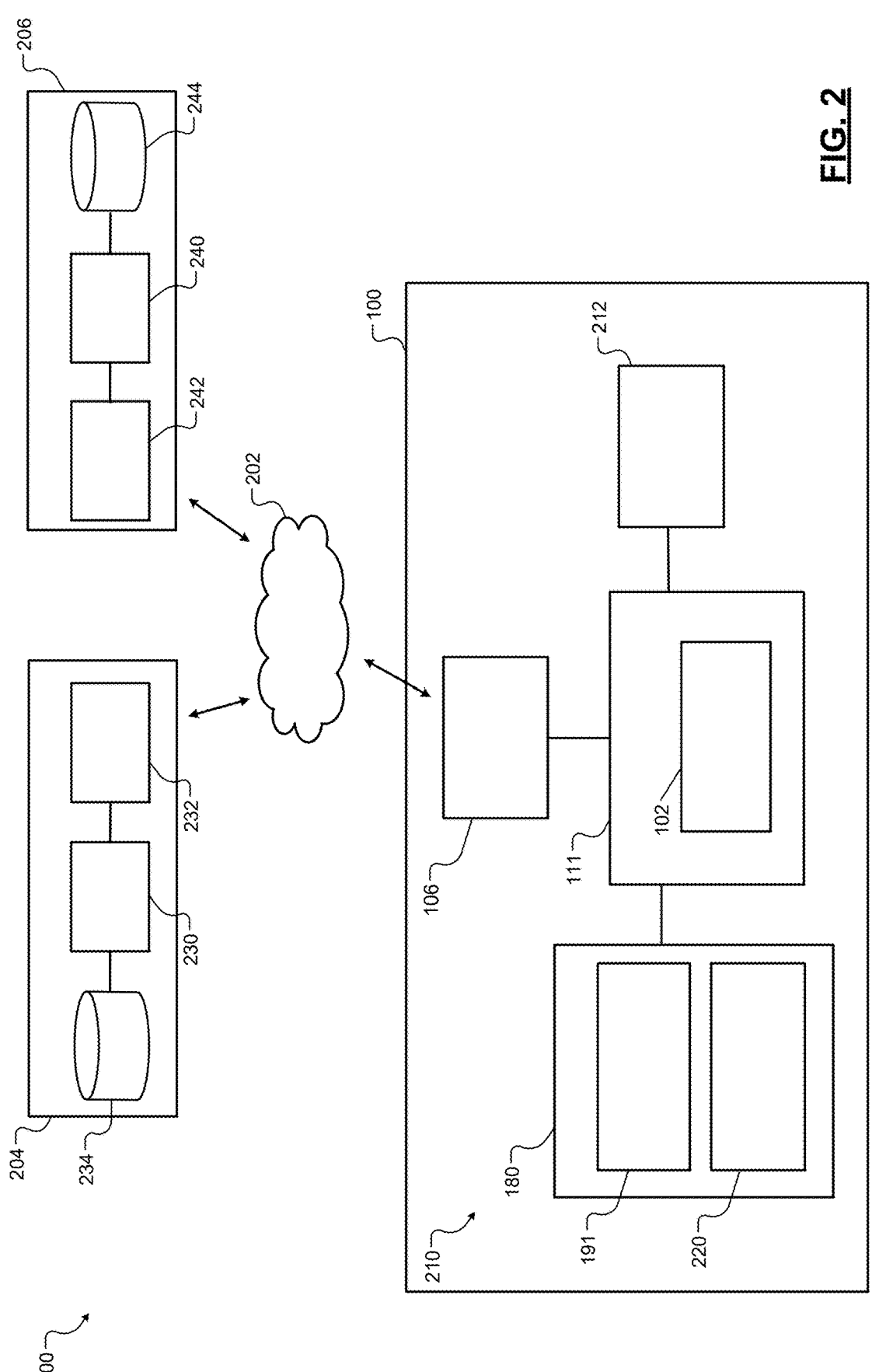
FIG. 2 is a functional block diagram of an example communication system including the host vehicle in accordance with the present disclosure.

FIG. 2 shows a communication system 200 including the host vehicle 100, a distributed communications system 202, a cloud-based network device 204, and a back office 206. A portion 210 of the DAS 101 of FIG. 1 is shown. The portion 210 includes the vehicle control module 111, the telematics module 106, the memory 180, and an HMI 212, which may include any interfacing devices referred to herein including displays, speakers, haptic devices, lights, etc. The assisted driving module 102 may utilize a windshield as a display and provides an augmented reality via an augmented reality heads up display (ARHUD). The vehicle control module 111 includes the assisted driving module 102.

The memory 180 includes the off-board inputs 191 and on-board inputs 220. The off-board inputs 191 may include: GPS information; information received via the Internet; and/or information received via V2X communication, WiFi communication, cellular communication, and/or satellite communication. The off-board inputs 191 may include information received from the cloud-based network device 204 and/or the back office 206. The on-board inputs 220 may include posture, arm, hand and head positions, eye positions, and gaze angle of a vehicle occupant, automated driving system status information, vehicle braking information, steering angle information, object detection information, vehicle acceleration information, etc. This information may be provided via the sensors referred to herein.

The cloud-based network device 204 may include a control module 230, a transceiver 232, and a database 234. One or more cloud-based network devices may be included and include one or more edge devices. The back office 206 may include a control module 240, a transceiver 242, and a database 244.

The devices 204, 206 may create, store, and modify occupant preference profiles, each of which being specific to a particular person (driver and/or vehicle occupant). A profile may include preferences with regards to alert messages, when and what type of alert message to provide, whether the person likes reactive messages, whether the person likes proactive messages, etc. As an example, a profile may indicate if a person has loss of hearing, limited feeling in legs or rear, etc. such that certain types of alerts should not be provided. A profile may indicate if a driver typically looks at a particular display and provide alerts on that display. A profile may be accessed for a driver based on the driver's dedicated identifier (ID), using face recognition, fingerprint recognition, voice recognition, a username, a password, etc. The profiles are shared with the vehicle and may be created, stored and/or modified by the vehicle, such as by the assisted driving module 102 and/or one of the modules 103, 104, 105 of FIG. 1. The preferences may be used and updated during each drive cycle. The preferences may also be shared with multiple vehicles. A driver may switch vehicles and the driver's preferences may be provided to and used by each of the vehicles.

The assisted driving module 102 may utilize computer vision, machine learning, V2X communication, and cloud computing to highlight objects within a scenario which the host vehicle 100 should yield to including pedestrian(s), obstructing roadway objects, oncoming (right-of-way) traffic, and/or other objects. Machine learning algorithms may be used to classify types and trajectories of objects located within range of the planned pathway of host vehicle 100. The assisted driving module 102 may provide a graphical user-interface to convey presence and intention (i.e., predicted paths) of detected objects. The assisted driving module 102 may track locations of the host vehicle 100 and other objects, speed of host vehicle 100 and other objects, trajectories of the host vehicle 100 and other objects, roadway curvatures, vehicle steering, etc. and display images via the HMI 212 based on these locations, speeds, trajectories, and roadway curvatures. The assisted driving module 102 may also display the images having selected type, size, shape and color based on the stated information and occupant position, host vehicle location, and other vehicle sensed aspects of the driving environment.

Figure 3:
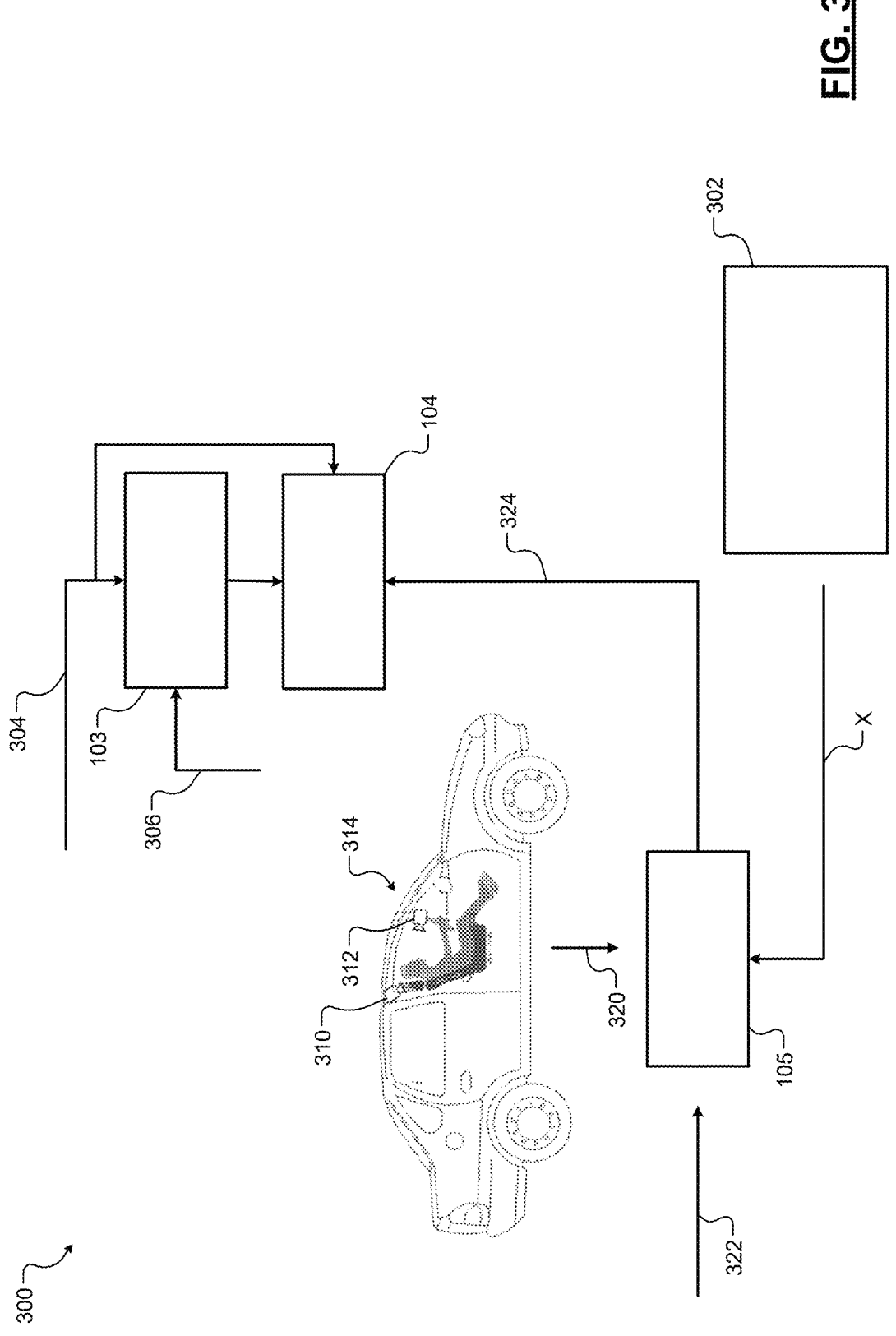
FIG. 3 is a functional block diagram an example adaptive driving automation system in accordance with the present disclosure.

FIG. 3 shows an adaptive driving automation system 300 that includes the adaptive alert module 103, the multimodal conversational interface module 104, the in-context active learning module 105 and, for example, an assisted (e.g., hands-free) driving system 302. The assisted driving system 302 may include steering, braking and propulsion systems, as shown in FIG. 1, which are used to conduct hands-free driving. The modules 103, 104 receive parameters and/or data associated with and/or perform precondition checks, such as checking time and speed limitations, distances to other vehicles, and checking visibility conditions, designated as 304. Some additional example precondition checks are referred to with respect to FIG. 4. The modules 103, 104 may also receive parameters and/or data associated with and/or perform driving posture and gaze detection and tracking, designated as 306. Posture and gaze detection and tracking may be implemented via cameras 310, 312 of a DMS 314. The cameras 310, 312 may be mounted in various locations such as on a B-pillar, on a headliner, on a steering wheel, on an A-pillar, etc.

The in-context active learning module 105 may monitor the posture and gaze, designated 320, of the driver and based on a personalized cloud profile 322, fine tune a LLM implemented by the multimodal conversational interface module 104. A fine tune signal 324 may be send from the in-context active learning module 105 to the multimodal conversational interface module 104. The in-context active learning module 105 may receive assisted and automated driving system tracking information from the assisted driving system based on which the fine tune signal may be generated. The assisted and automated driving system tracking information may include a state of the system 302 including target speed, steering angel, acceleration, deceleration, etc. The in-context active learning is domain specific.

The in-context active learning may include monitoring driver responses, expressions, movement, etc., which may occur in response to reactive responses and proactive messages provided by the multimodal conversational interface module 104. The in-context active learning module 105 may adjust when, how often, duration, and types of alerts provided based on the in-context active learning. The adaptive alert module 103 adjusts the durations, intensities, and locations of alerts and device(s) providing the alerts based on the posture and gaze of the vehicle occupant.

Figure 4A:
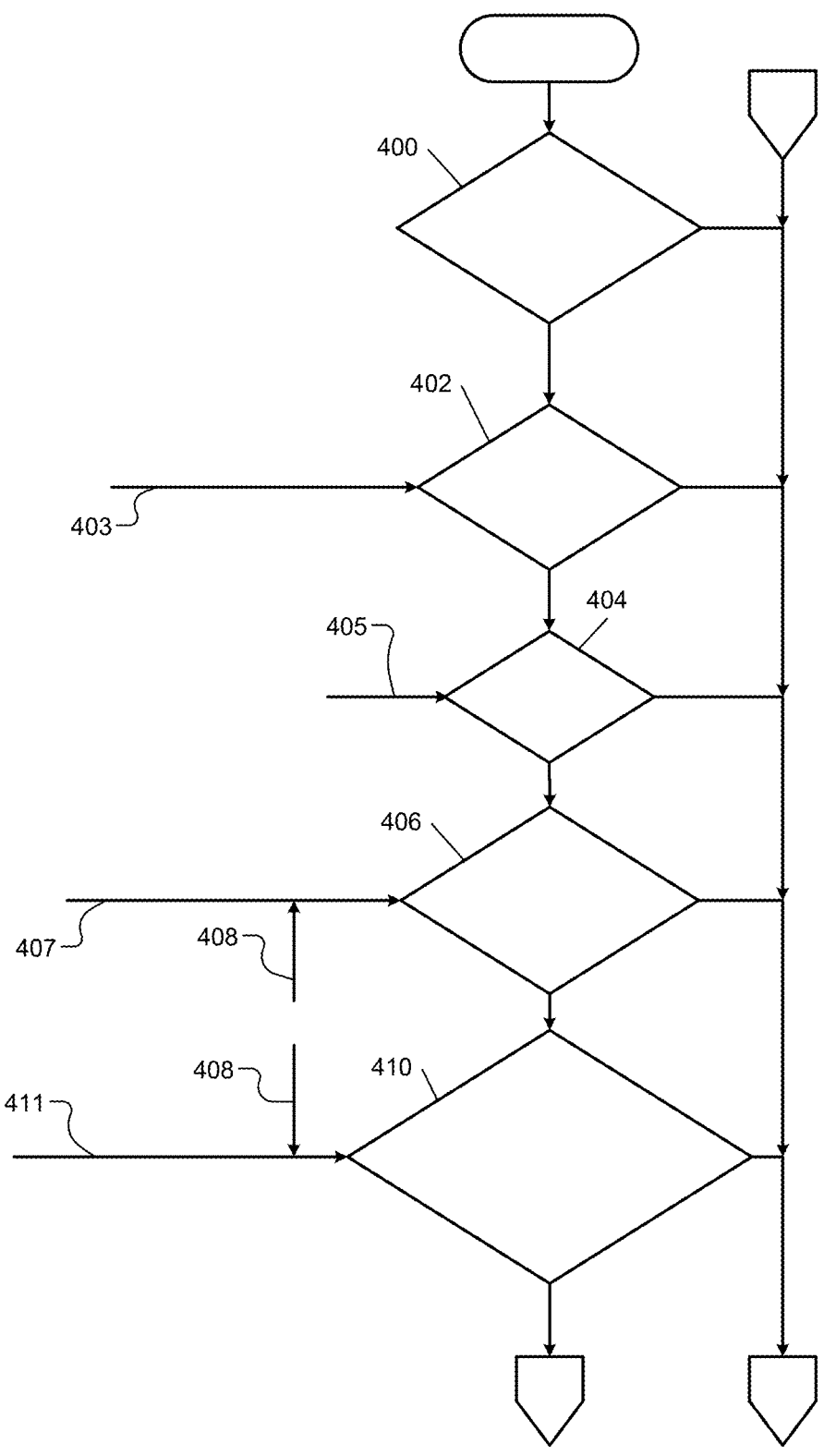
FIGS. 4A and 4B (collectively FIG. 4) illustrates an example precondition check method in accordance with the present disclosure.
Figure 4B:
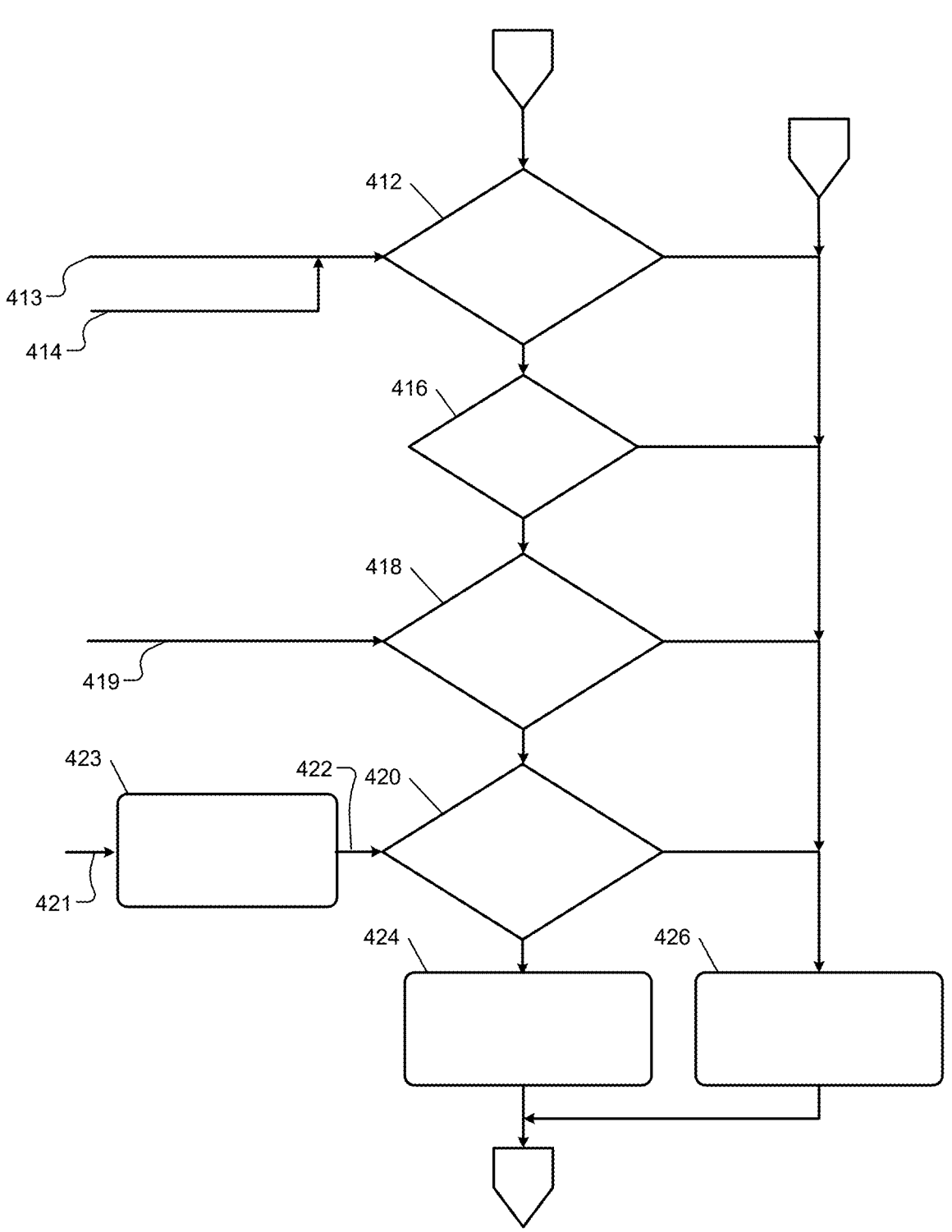

FIG. 4 shows a precondition check method. The following operations may be iteratively performed. Although the following operations refer to some example precondition checks, other precondition checks may be performed.

At 400, the assisted driving module 202 determines whether lane markings and lane borders are visible. If yes, operation 402 is performed, otherwise operation 426 may be performed.

At 402, the assisted driving module 202 determines whether a speed of the host vehicle is within a predetermined range (i.e., between a first threshold EPS1 and a second threshold EPS2). The thresholds values EPS1 and EPS2 may be calibratable speed threshold values that are provided as designated by arrow 403. If yes, operation 404 is performed, otherwise operation 426 may be performed.

At 404, the assisted driving module 202 determines whether the vehicle speed is greater than a third threshold EPS3. The third threshold EPS may be calibratable and provided as designated by arrow 405. If yes, operation 406 is performed, otherwise operation 426 may be performed.

At 406, the assisted driving module 202 determines whether distance(s) between the host vehicle and other car(s) in an oncoming lane is less than a fourth threshold EPS4. Threshold EPS4 may be calibratable and provided, as designated by 407. The distance(s) may be determined based on traffic data represented as 408. The traffic data may be received from a cloud-based network device and include front camera data, long range radar data. If yes, operation 408 is performed, otherwise operation 426 may be performed.

At 410, the assisted driving module 202 determines whether distance(s) between the host vehicle and other vehicle(s) and/or obstacle(s) in same driving direction are less than a fifth threshold EPS5. The distance(s) may be determined based on the traffic data 408. If yes, operation 412 is performed, otherwise operation 426 may be performed.

At 412, the assisted driving module 202 determines whether road curvature is less than a sixth threshold EPS6 for a next predetermined traveling distance (e.g., 200 meters). Threshold EPS6 may be calibratable and provided as designated by 413. This determination may be based on map data, as designated by 414. If yes, operation 414 is performed, otherwise operation 426 may be performed.

At 416, the assisted driving module 202 determines whether there is a lane change event or a lane fusion event for the host vehicle. If yes, operation 418 is performed, otherwise operation 426 may be performed.

At 418, the assisted driving module 202 determines whether the host vehicle is in a busy traffic area and/or an area that is prone to accidents. This may be based on received police data, as designated by 419. If yes, operation 420 is performed, otherwise operation 426 may be performed.

At 420, the assisted driving module 202 determines whether there is low visibility, inclement weather, and/or a low light condition. This may be based on data from sensors, such as a sun load sensor, a light detection sensor, etc. This may also be based on a contextual time limitation of feature active function, as represented by box 423 and arrow 422. The feature active function may be based on the driver's age (represented by arrow 421), for example, whether the driver is a teenager or an older driver. The driver's age may be determined based on the driver's profile and/or data from the DMS. The DMS may be used to determine a state of the driver including determining whether the driver is paying attention to the road ahead, is drowsy, is suffering from a headache, etc. This may be based on the posture, head and eye positions, gaze angle, facial expressions, etc. These are inputs that can be used for determining and changing an alert strategy and for conversational messages to the driver as further described herein. If there is low visibility, inclement weather, and/or a low light condition, then operation 424 may be performed.

At 424, the assisted driving module 202 operates in an adaptive alert mode and provides adaptive alert(s) based on the precondition checks and other collected and determined information, some of which is referred to above. The assisted driving module 202 operates in the adaptive alert mode and provides the adaptive alerts while operating in an assisted driving mode (e.g., a hands-free assisted driving mode).

At 426, the assisted driving module 202 may end operating in the adaptive alert mode if currently operating in the adaptive alert mode and/or operate in the assisted driving mode without providing adaptive alerts.

Figure 5:
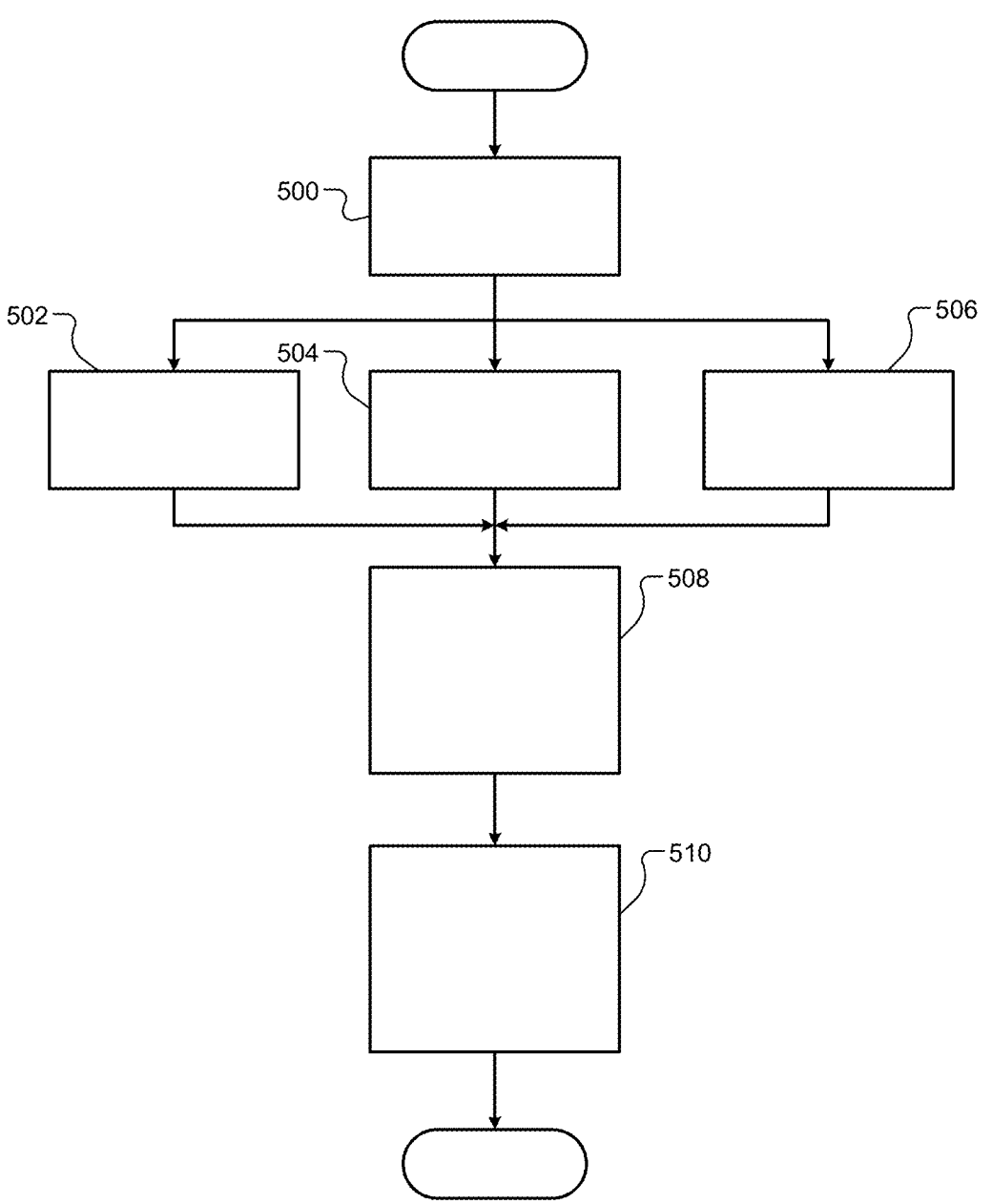
FIG. 5 illustrates an example driving posture and gaze detection and tracking method for adaptive alerting and multimodal conversation in accordance with the present disclosure.

FIG. 5 shows a driving posture and gaze detection and tracking method for adaptive alerting and multimodal conversation. The following operations may be iteratively performed.

At 500, the assisted driving module 102 of FIG. 1 may receive data from the DMS and other interior sensors (e.g., interior cameras and/or imaging radar sensors). At 502, the assisted driving module 102 may determine, based on the received data, a pose of arms of the driver (or vehicle occupant) and positions of the hands of the driver.

At 504, the assisted driving module 102 may determine, based on the received data, a head pose (or position and orientation of the driver's head) with respect to road ahead (or centerline of a lane in which the host vehicle of the driver is driving).

At 506, the assisted driving module 102 may determine, based on the received data, eye gaze including eye positions and gaze angle.

At 508, the assisted driving module 102 sends the pose of the arms, the positions of the hands, the pose of the head, and the eye gaze information to the adaptive alert module 103. This information allows the adaptive alert module 103 to determine how well a driver is paying attention, whether the driver is shifting from left to right, whether the driver's eyes are shifting around, where the driver's eyes are focused, how long the driver is looking in each direction, etc. The adaptive alert module 103, as described herein, adaptively determines and implements an alert strategy based on this information including determining and adjusting durations, intensities, and types of alerts (or messages).

At 510, the multimodal conversational interface module 104 receives at least the eye gaze information and based on this information determines types of alert messages to generate including visual, audible, and/or haptic alert messages.

Figure 6:
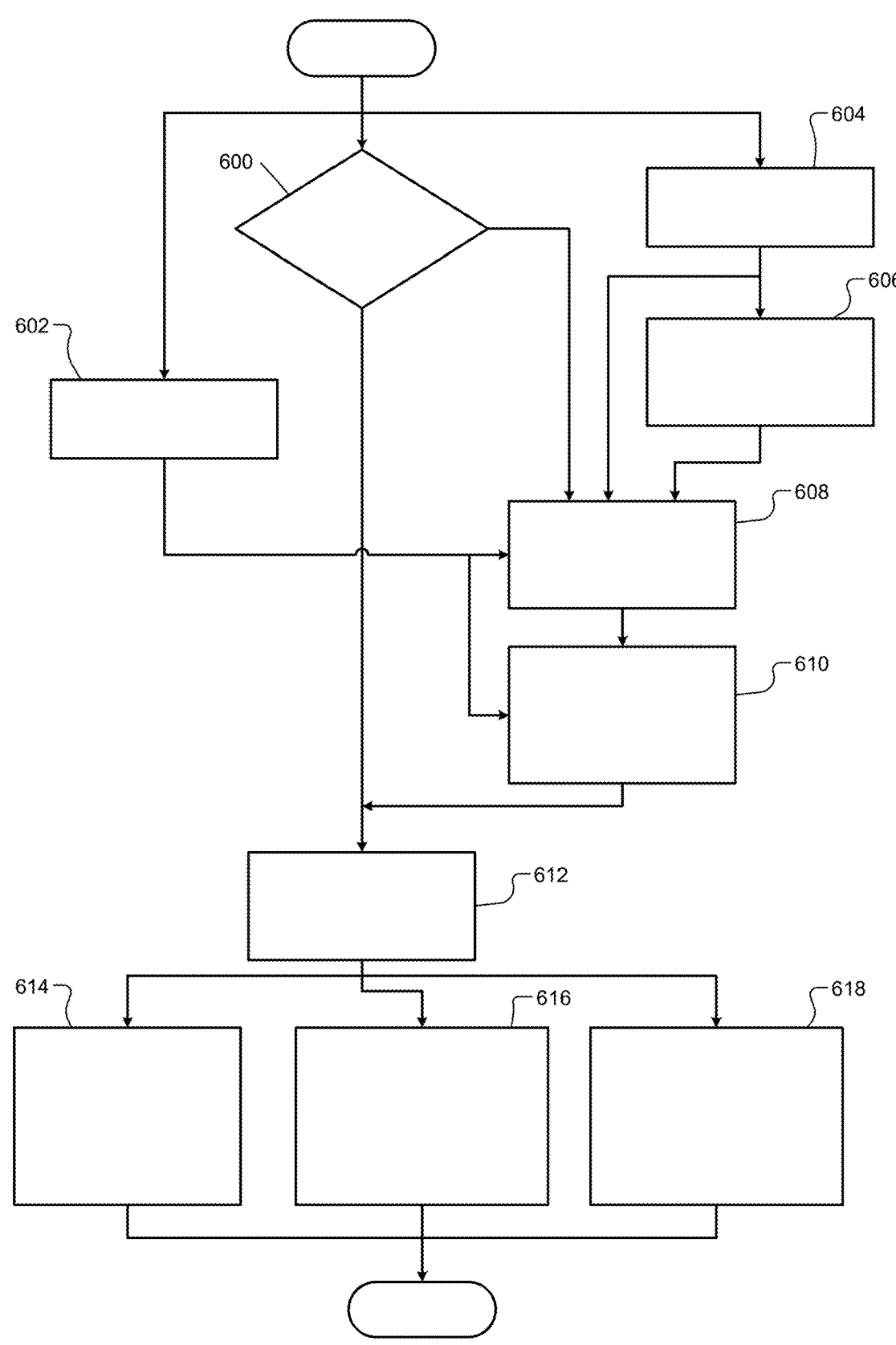
FIG. 6 illustrates an example adaptive alerting and multimodal conversational interfacing method in accordance with the present disclosure.

FIG. 6 shows an adaptive alerting and multimodal conversational interfacing method. The following operations may be iteratively performed.

At 600, the assisted driving module 102 and/or the adaptive alert module 103 determines whether precondition checks, such as those referred to herein, are satisfied. If yes, operation 608 may be performed, otherwise operation 612 may be performed.

At 602, the assisted driving module 102 may detect and track the occupant posture and gaze as described herein.

At 604, the assisted driving module 102 may obtain the threshold EPS6.

At 606, the in-context active learning module 105 of FIG. 1 may perform active leading of driver's (or occupant's) response time based on the threshold EPS6 and other monitored data.

At 608, the adaptive alert module 103 customizes timing and severity of an adaptive alert including customizing duration and intensity level of the alert. This may be based on the detected and tracked occupant posture and gaze information and the response time. The alert may be non-linear in duration and/or intensity and can be based on how much the driver is paying attention (e.g., how much the driver is looking away from the road ahead of the host vehicle).

At 610, the adaptive alert module 103 may use directional ambient light and sound to redirect the driver's (or occupant's) attention to a certain point or area. The point or area may be, for example, on a display, on a windshield, on a road ahead, etc. This may be accomplished using one or more light bars, smart glass, ambient lighting, a center stack screen, etc. to provide a multimodal alert. The alert may be provided without the driver requesting information.

At 612, the assisted driving module 102 may end the adaptive alert mode and/or operate in an assisted driving mode without providing adaptive alerts.

At 614, while operating in the assisted driving mode, the assisted driving module 102 may use directional ambient light and directional sound to communicate decision making and direction of a threat.

At 616, while operating in the assisted driving mode, the assisted driving module 102 may use enhanced visuals in instrument cluster and/or in center stack to communicate decision making when user looks at instrument cluster or center stack.

At 618, while operating in the assisted driving mode, the multimodal conversational interface module 104 may indicate why the assisted driving mode is disabled. This may be accomplished via an artificial intelligence (AI) conversational agent of the assisted driving module 102 to indicate why the system transitioned out of the assisted driving mode. The assisted driving module 102 may voluntarily provide information about situations the driver is unaware of or doesn't understand. For example, the assisted driving module 102 may disengage the assisted driving mode and the driver does not understand or know why this occurred and the assisted driving module 102 may indicate the reason. For example, one or more of the precondition checks may no longer be satisfied. The AI conversational agent may be reactive and/or proactive in providing information to the driver. The AI conversational agent may also be interactive with the driver and hold a conversation, where the AI conversational agent sends messages to the driver and receives responses from the driver.

Figure 7:
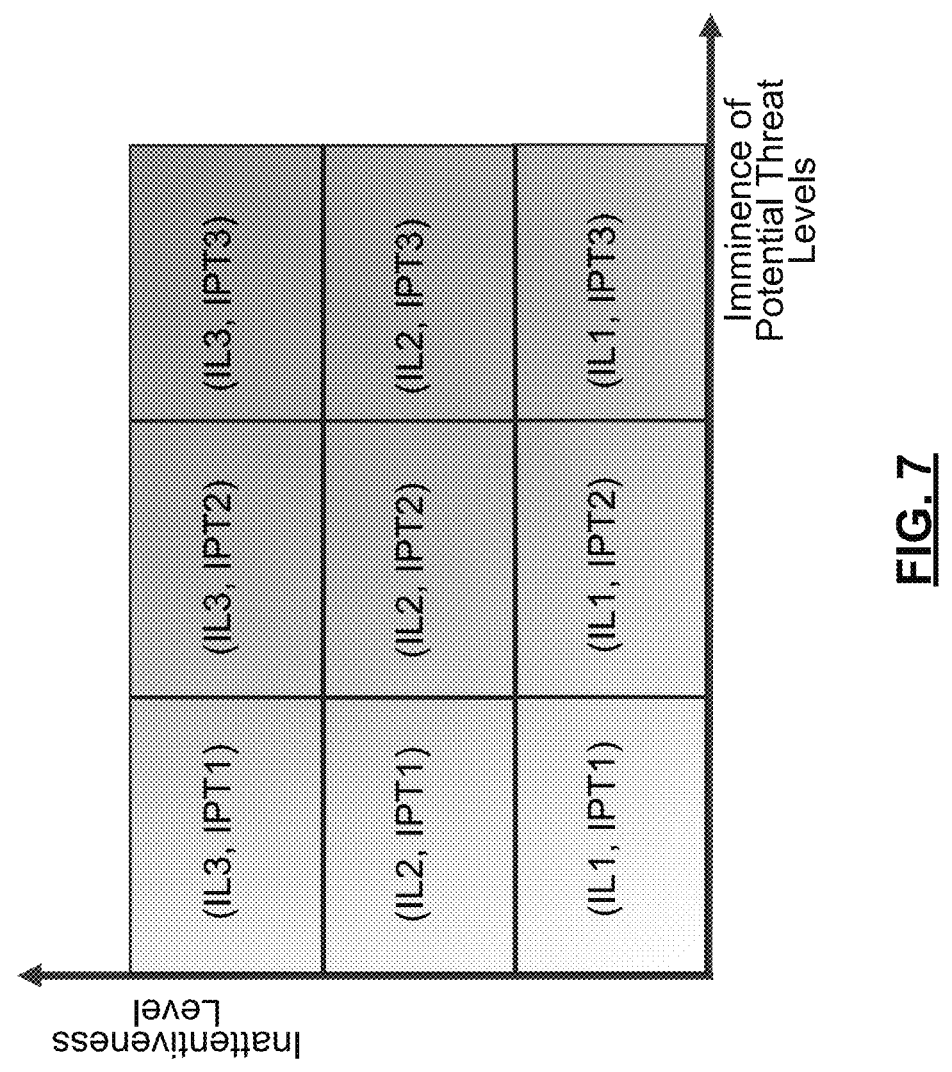

FIG. 7 shows a plot illustrating durations and intensities of alerts based on inattentiveness and imminence of potential threats. Although nine regions are shown, any number of regions may be included. Each region has a respective inattentiveness level of the driver (or occupant) and an imminence of a potential threat level (e.g., time until host vehicle potentially collides with an impending object). The inattentiveness levels may be based on and/or be a function of driver posture and time and speed limitations and range from low to high. The imminence of potential threat levels may be based on visibility conditions and distances to other nearby vehicles and range from low to high. IL1-IL3 refer to inattentiveness levels. IPT1-IPT3 refer to imminence of potential threat levels. IL1 and IPT1 being the lowest levels and IL3 and IPT3 being the highest levels.

Each region of the regions has a respective alert duration and intensity level associated with an alert provided by the adaptive alert module 103 of FIG. 1. The first region with IL1, IPT1 may be associated with a long duration and a low intensity level alert (e.g., low brightness and/or sound level of alert and/or small size of alert). The second region with IL1, IPT2 may be associated with a short duration and a medium intensity level alert. The third region with IL1, IPT3 may be associated with a short duration and a high intensity level alert. The fourth region with IL2, IPT1 may be associated with a longer duration and a low intensity level alert. The fifth region with IL2, IPT2 may be associated with a medium duration and a medium intensity level alert. The sixth region with IL2, IPT3 may be associated with a short duration and a high intensity level alert. The seventh region with IL3, IPT1 may be associated with a longer duration and a medium intensity level alert. The eighth region with IL3, IPT2 may be associated with a longer duration and a medium intensity level alert. The ninth region with IL3, IPT3 may be associated with a short duration and a very high intensity level alert.

The first, second and third regions may be associated with the driver looking forward and speed of vehicle is less than, for example, 40 kilometers per hour (km/hr). The fourth, fifth and sixth regions may be associated with the driver looking to the side and speed of the host vehicle being greater than 40 km/hr and less than, for example 80 km/hr. The seventh, eighth and ninth regions may be associated with the driver looking to the floor or at mobile phone with vehicle speed being greater than, for example, 100 km/hr.

The first, fourth and seventh regions may be associated with good visibility and no vehicles near the host vehicle. The second, fifth and eighth regions may be associated with 80% visibility and two vehicles nearby and behind the host vehicle. The third, sixth and ninth regions may be associated with poor visibility and greater than six vehicles nearby and/or in front and behind the host vehicle.

Adaptive alerts are provided based on the region and associated conditions the host vehicle is currently experiencing. This includes timing of (or when) the alert is triggered and how long the alert is provided. The alert is provided to address a potential threat and address a lack of attention to the road by the driver. Multimodal interaction with the driver may occur and may include graphic alerts, audio alerts, haptic alerts, lighting-based alerts, speech alerts, etc. One or more modalities may be used to provide each alert. In an embodiment, multiple modalities are used to provide a single alert. In an embodiment, the more intense the alert, the more modalities are used.

Figure 8:
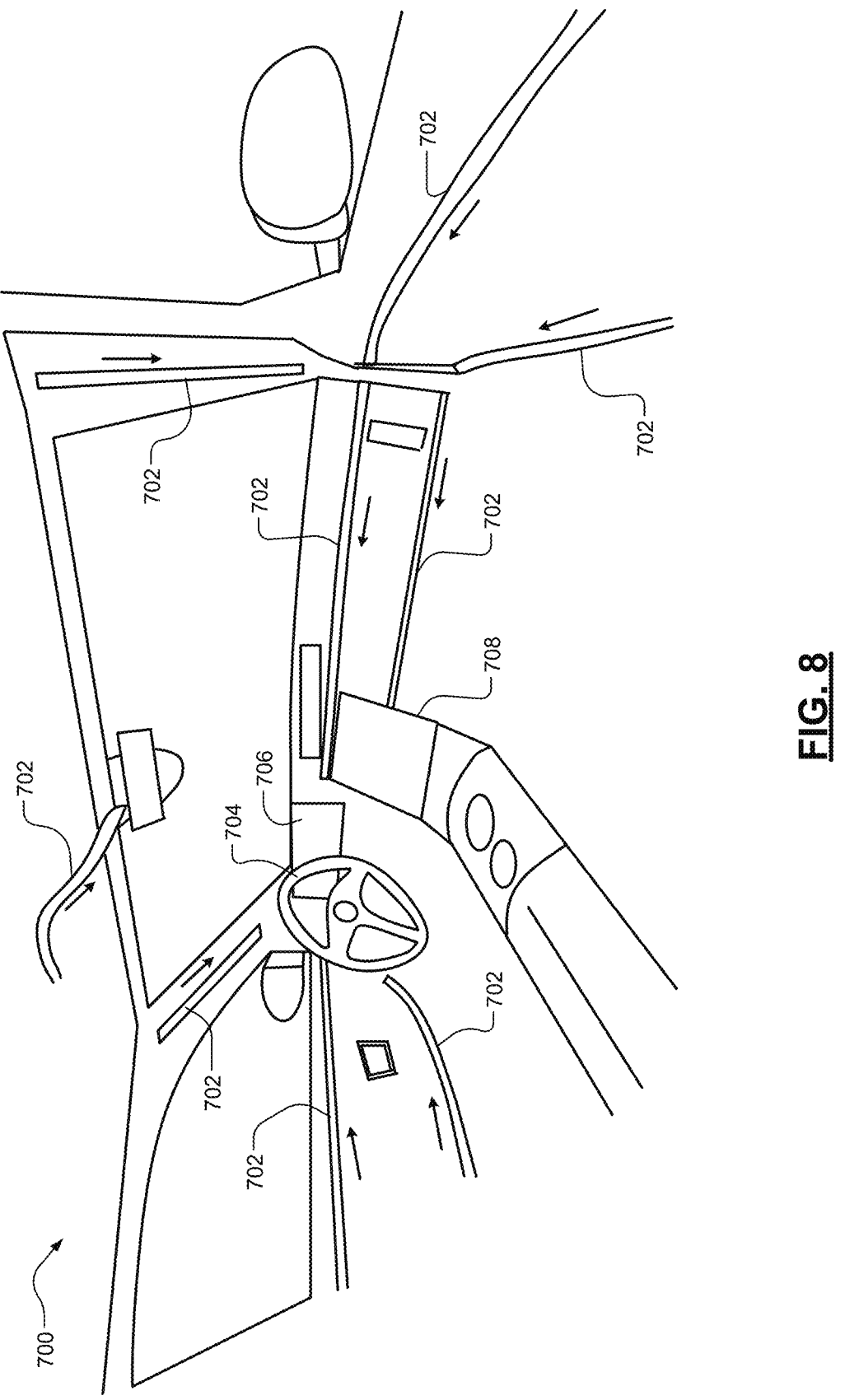
FIG. 8 is a perspective view of an example interior of a vehicle providing directional alerting via an interior lighting system in accordance with the present disclosure.

FIG. 8 shows an interior 700 of a host vehicle providing directional alerting via an interior lighting system. Example light bars 702 are shown and may be used to provide directional lighting to direct a driver to a certain location. This may be done to direct the driver's attention to an area outside the vehicle and/or to direct the driver to an alert message being provided. The light bars 702 may include, for example, multiple LEDs that are illuminated in a sequential pattern. As an example, the light bars may be illuminated such that LEDs furthest from the area of interest are illuminated first and LEDs nearest the area of interest are illuminated last. In this way, the light bars 702 are animated. Arrows shown near the light bars as an example of the direction at which LEDs of the light bars may be illuminated to direct the driver to the road ahead. The lights may be strobed, illuminated in various patterns, etc. The interior 700 may include other lights, which may be illuminated along with the light bars 702 in various patterns. The lights of the interior may be used to direct the driver's attention to one of the displays of the interior, the road ahead, or another point and/or area of interest. In an embodiment, ambient lighting is also or alternatively adjusted. This may include adjusting tint level of windows, closing one or more shades, etc.

The interior 700 includes a steering wheel 704, an instrument cluster display 706 and a center stack display 708. The displays 706, 708 may be used to display alerts. The steering wheel 704 may also include lighting, which may blink to get the drivers attention to look at the instrument cluster display 706.

The multimodal conversation interface module 104 of FIG. 1 may have interactive conversations with a driver (or occupant) to perform reactive assistance and guidance. Table 1 includes example questions that the driver may ask the conversational (or AI) agent of the multimodal conversation interface module 104. The agent may then respond with answers to the driver's questions. The requests and responses may be provided verbally and/or via one or more modalities. The agent may implement a "frozen" and/or fine tuned LLM, which is used to provide the responses. The LLM is domain specific to provide relevant answers and feedback based on context. The agent may provide responses based on auto-extraction and/or determination of context information such as the precondition checks, driver posture detection and tracking, and/or other driver state information. This information and other information referred to herein may be stored in memory and/or accessed from one or more network devices separate from the host vehicle.

Figure 9:
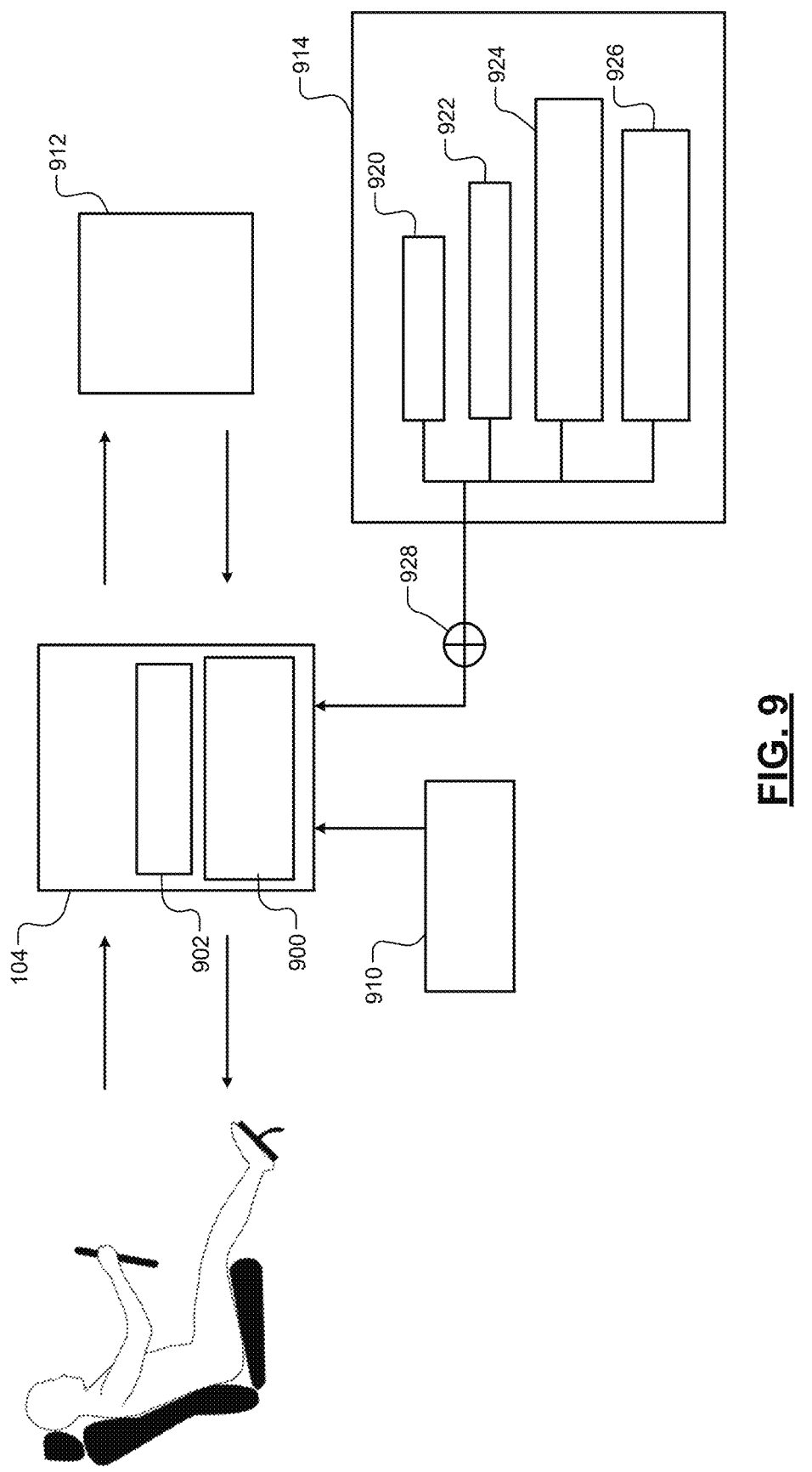
FIG. 9 is a functional block diagram of an example multimodal conversational interface module performing in-context active learning for a frozen and fine-tuned domain specific LLM in accordance with the present disclosure.
Figure 10:
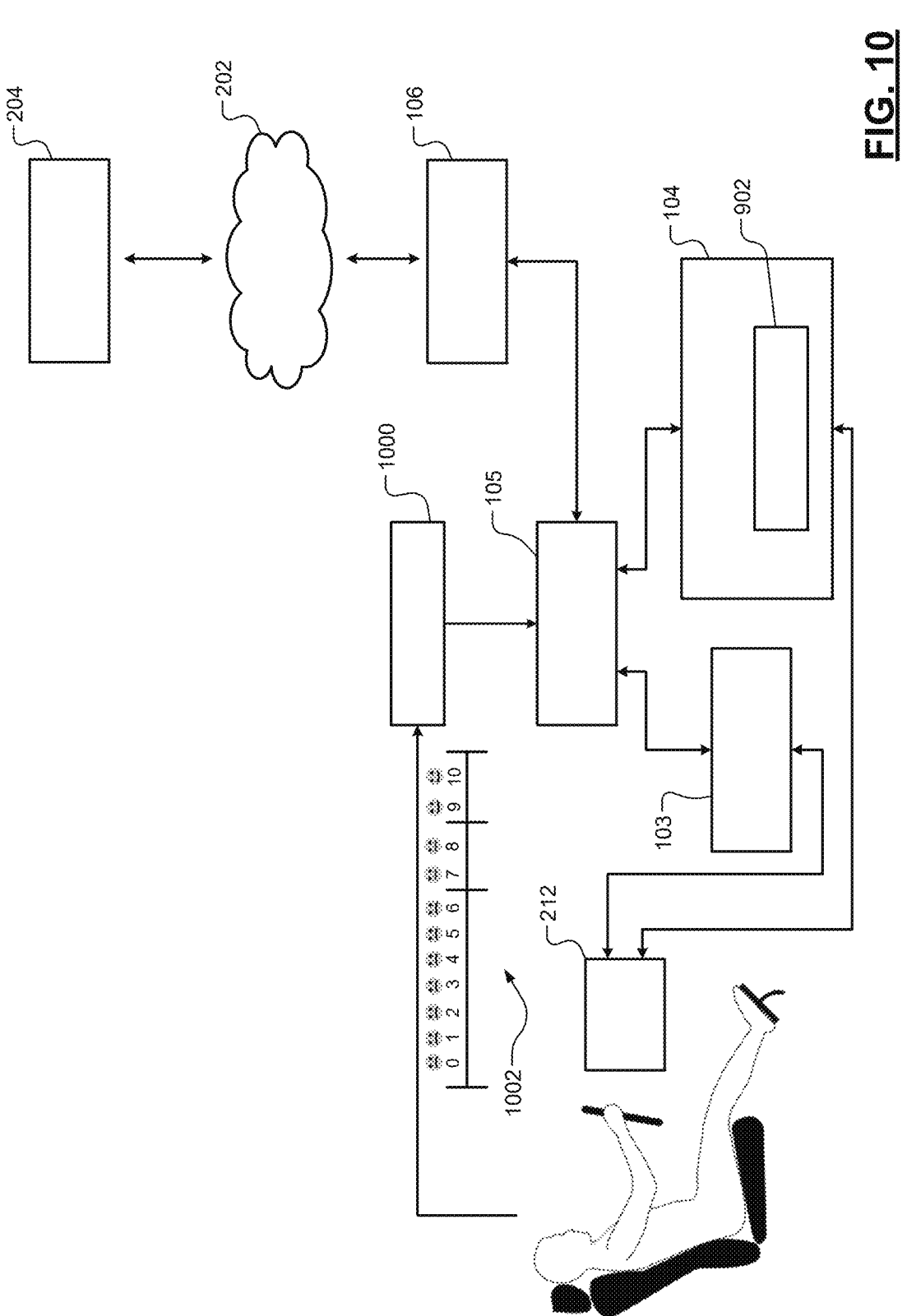
FIG. 10 is a functional block diagram of an example in-context active learning module in accordance with the present disclosure.

FIGS. 9 and 10 show the multimodal conversational interface module 104 and in-context active learning module 105 performing in-context active learning for a frozen and/or fine-tuned domain specific LLM 900, such as that referred to herein. The in-context active learning module 105 may be implemented as part of the multimodal conversational interface module 104. The multimodal conversational interface module 104 may also include a conversational agent (or AI) agent 902 such as any of the conversational and/or AI agents referred to herein. The multimodal conversational interface module 104 performs the in-context active learning based on feedback from the driver, inaction of the driver to messages provided by the agent 902, etc. The feedback may be in response to alert messages provided to the driver by the agent.

The feedback may include explicit and/or implicit feedback. The explicit feedback may include net promotor score (NPS) scoring. For example, the feedback may include score levels provided from the driver with regards to previous alert messages generated. The score levels indicate whether the

TABLE 1

| Context | Example Question from Driver |
| --- | --- |
| What? | What is Assisted Driving Mode?<br>Do I need to pay attention if Assisted Driving Mode is engaged?<br>What is the meaning of each button/cluster graphic, light, or alert (e.g., steering-wheel light bar green/read flash, beeps or safety alert seat vibration, driver information center (DIC) messages)?<br>What are driving considerations to use during Assisted Driving Mode (e.g., road compatibility, visibility, attention)?<br>Will Assisted Driving Mode steer to avoid safety situations, objects or road impediments? |
| How? | How can I activate/disengage Assisted Driving Mode?<br>How can I change lane while in Assisted Driving Mode?<br>How can I speed up/down while in Assisted Driving Mode?<br>How does Assisted Driving Mode know how fast to go?<br>How is the map information used by the Assisted Driving Mode?<br>How do I know if my vehicle has lane change on demand? |
| Where? | Where can I use Assisted Driving Mode?<br>Where can I find Assisted Driving Mode button? |
| When? | When do I need to take over control? |
| Why? | Why doesn't Assisted Driving Mode work?<br>Why is Assisted Driving Mode disengaged?<br>Why do I see flashing light on the steering wheel? |

The multimodal conversation interface module 104 also implements proactive assistance and guidance. Table 2 includes examples of proactive messages provided to a driver.

driver liked, is neutral, or disliked the alert messages provided. Implicit feedback may be provided when driver takes over control and does not provide an explicit response. A negative score may be generated when the driver does not

TABLE 2

| Context | Example |
| --- | --- |
| What? | Messages to educate the user for the first time about Assisted Driving Mode |
| Why? | Alert and explain why Assisted Driving Mode cannot be activated (e.g., lack of compatible roads or limited visibility or lack of attention).<br>Alert and explain why Assisted Driving Mode is disengaged (e.g., distracted driving).<br>Explain why Assisted Driving Mode changes lane.<br>Explain why Assisted Driving Mode accelerates/decelerates (e.g., to match the change in the speed limits). |
| Where? | Promote use of Assisted Driving Mode based on the location subject to the driving conditions. |
| When? | Promote use of Assisted Driving Mode based on the driving conditions subject to road compatibility. |
| How? | Intervene and explain how to activate the Assisted Driving Mode if the user has a misconception or doesn't know how to do it after number of trails. | respond to or ignores a message, disengages the alert messaging, overrides a recommendation provided in an alert message, and/or stops the agent from voluntarily providing information to the driver. The scoring is recorded and reward-based operations may be performed by reward module 1000. For example, certain types of messaging may be rewarded and other types of messaging may be penalized based on the scoring. The scoring and rewarding may be stored as part of a driver's profile of preferences. Future alerts are generated based on the rewarding. For example, if certain types of messaging are penalized, then frequency of those types of messages is reduced and/or those types of messages are no longer provided.

The multimodal conversational interface module 104 is configured to i) receive first scores from the occupant regarding the alerts, ii) generate second scores based on responses and lack of responses to the alerts, and iii) generate rewards based on the first scores and the second scores. The adaptive alert module 103 is configured to change an alert strategy for the occupant based on at least one of the rewards, which are a function of the first and second scores.

An example score bar 1002 is shown, which may be displayed to the driver when providing feedback. The score bar includes numbers 1-10, where 1 is the lowest score and 10 is the highest score. Faces may be displayed near the numbers which may have different facial expressions and be in different colors, depending on the score value. For example, a 1 may be a sad face and be red in color, whereas a 10 may have a smiley face and be green in color. A neutral score may have a straight face and be yellow in color. As an example, scores 1-6 may be referred to as detractors, scores 7-8 may be referred to as passive scores, and scores 9-10 may be referred to as promoters.

The multimodal conversational interface module 104 may perform the state learning based on reactive and proactive templates 910, information provided to and/or received from an assisted (e.g., hands-free) driving system 912, and learned information, represented by box 914. The templates may include context information and explanations including requests for assisted driving signals and reactive and proactive guidance.

The learned information may be provided by implementing few-shot (FS) learning (designated 920), one-shot (1S) learning where K=1 (designated 922), zero-shot (0S) learning with a natural language description (designated 924), and fin-tuning (FT) training on thousands of examples (designated 926). FS, 1S and 0S learning focuses on customizing LLM without changing parameters, thus the name "frozen" LLM. FT training includes fine tuning parameters using a small number of examples (e.g., a few thousand examples). The LLM is a domain specific LLM that is context based. The natural language description of 0S learning is an explanation without indicating to LLM what response is expected from the LLM for each context. The stated learning/training may be done without changing parameters of the LLM such that a large amount of data is not needed to train the LLM. A summer 928 is shown and may be used to combine the information generated by implementing one or more of 920, 922, 924, 926.

The modules 104, 105 may perform the stated learning/training based on information received from the cloud-based network device 204 via the telematics module 106 and the distributed communications system 202. Information learned may also be provided from the modules 104, 105 to the cloud-based network device 204.

The examples disclosed herein: 1) provide adaptive alerts based on eye gaze, head pose, arm pose detection and tracking signals for an enhanced assisted/automated driving experience unlike traditional fixed time alerting systems that do not take into consideration the level of inattentiveness of vehicle occupant; 2) provide adaptive/multi-level alert durations and modalities (e.g., multi-level audio/ambient light/graphics/haptic devices/light bars/smart glass/center stack screen, etc.), in order to enhance the communication experience with the occupant in comparison to the traditional single mode/level alerting systems; 3) use multimodal communication to indicate sensed threat, level of urgency, and why an assisted driving mode is disengaged; 4) implement an AI conversational agent to provide reactive and proactive assistance for assisted and automated driving with in-vehicle guidance and familiarization; and 5) implement in-context learning to learn a driver's preferences and update the personalized profile which may be stored locally in host vehicle and/or remotely in a cloud-based network device. The examples provided herein: increase enjoyment of vehicle ride; lower stress level and enable more relaxed driving; and enhance a driver experience and satisfaction with assisted driving.

The examples set forth herein include a system and a method to enabling adaptive alerting, multimodal conversational HMI and in-context active learning after checking a number of preconditions and taking into consideration the driving posture.

The examples further include performing precondition checks such as time and speed limitations, distance to other vehicles and visibility conditions are checked and used to enable adaptive alert strategy and multimodal conversational HMI. This check includes the use of visibility confidence of lane markings and/or road shoulders to ensure minimum threshold and when to transition back to an assisted driving mode without adaptive alerts and the use of front sensing and optionally cloud traffic to determine degree of isolation/remoteness/traffic density to determine when it is safe to drive in the suggested mode.

The examples further include an adaptive alert strategy and multimodal conversational HMI that also take into consideration the driving posture detected using driver monitoring system. This includes the use of deviation of eye gaze, head pose, arm pose from road ahead to adapt the alert time and to adapt the level of alert with respect to level inattentiveness (e.g. deviate little bit-gentle alert with ambient light, exceed adaptive alert situation and deviate very far-strong alert with haptic seat and audio). This adaptive alert strategy also weighs the difference between pose of main hand and non-main hand in an adaptive alert strategy such that the distance of the main hand outweighs the distance of the minor distance from the steering wheel.

The examples further include an enhancing HMI through the use of directional ambient light and sound to re-direct the driver's focus on the center of the road ahead and re-engage assisted driving mode and adaptive alerting mode; light bar and/or smart glass to re-direct driver's attention on road ahead; headlights flash in remote areas in low light when there are no other vehicles around; center stack display when driver is looking in direction of center stack module (CSM) to re-direct driver's focus and the use of enhanced graphic illustrations in cockpit display (e.g., CSM, instrument panel cluster (IPC)) to indicate spatial constellation related to decision making.

The examples further include an AI conversational agent to provide reactive and proactive assistance for assisted driving in-vehicle guidance and familiarization. This agent can reactively and proactively answer what/how/where/when and why questions related to assisted driving and the current context such as: when an alert is activated; why the assisted driving mode got disengaged (e.g., due to distracted driving); and why the assisted driving mode changes lane. Assisted driving may be activated if the user has misconception or doesn't know how to do it after number of trials.

The examples further include in-context learning (ICL) to learn the user's preferences and update the personalized cloud profile. ICL used user's explicit/implicit feedback (scoring, override) as a reward function. Learning in a specific context can involve utilizing a static LLM with Few-Shot (FS), One-Shot (1S), or Zero-Shot (0S) configurations, or alternatively, fine-tuning the model. In the FS approach, the model is presented with a small number of task demonstrations during inference, serving as conditioning, without updating any weights. These demonstrations consist of K instances of context and completion, followed by a single context example, with the model expected to generate the corresponding completion. The 1S setup is akin to FS but with K set to 1. The 0S setup mimics FS, but instead of examples, it relies on a natural language description of the task. Fine-tuning involves updating the weights of a pre-trained model through training on a multitude of supervised labels specific to the intended task. Fine-tuning entails adjusting the weights of a pre-existing model by exposing it to extensive training with numerous supervised labels tailored to the targeted task.

The examples include: adaptive alerting, a conversational agent, in-context learning, and adapting personalized cloud profiles; the use of directional ambient light and sound to re-direct the driver's focus on the center of the road ahead and re-engage assisted driving mode and the use of light bar and/or smart glass to re-direct driver's attention on road ahead; a method to determine when it is safe to allow for automated driving using location and police data base; logic of adapting a level of alert with respect to a level of inattentiveness and weighing a difference between pose of main hand and non-main hand; and the use of visibility confidence of lane markings and/or road shoulders to ensure a minimum threshold and when to transition back to an assisted driving mode without adaptive alerting; and providing adaptive alerts with enhanced graphic illustrations in cockpit display.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB®, SIMULINK®, and Python®.

What is claimed is:

1. An assisted driving system of a host vehicle, the assisted driving system comprising:

an adaptive alert module configured to adaptively generate alerts having variable duration and intensity;

a multimodal conversational interface module configured to implement a large language model to have a conversation with an occupant of the host vehicle using a plurality of modalities;

an in-context active learning module configured to fine tune the large language model of the multimodal conversational interface module; and an assisted driving module configured to operate in an assisted driving mode, and while in the assisted driving mode, perform a plurality of precondition checks to enable at least one of i) the adaptive alert module to operate in an adaptive alert mode and provide the alerts via a human machine interface (HMI) of the host vehicle, and ii) the multimodal conversational interface module to perform a multimodal conversation with the occupant via the HMI.

2. The assisted driving system of claim 1, wherein the assisted driving mode includes the assisted driving module controlling steering, acceleration and deceleration of the host vehicle.

3. The assisted driving system of claim 1, wherein the adaptive alert module is configured to adaptively change duration and intensity of alerts provided to the occupant based on a plurality of parameters.

4. The assisted driving system of claim 1, wherein the adaptive alert module is configured to adaptively change duration and intensity of alerts based on an inattentiveness level of the occupant and an imminence of a potential threat level.

5. The assisted driving system of claim 1, wherein the adaptive alert module is configured to adaptively change duration and intensity of alerts based on detected posture and gaze of the occupant.

6. The assisted driving system of claim 1, wherein:

the multimodal conversational interface module is configured to at least one of alert and provide messages to the occupant using the plurality of modalities; and the plurality of modalities comprise an audio device, a display, a haptic device, and one or more lights.

7. The assisted driving system of claim 1, wherein the multimodal conversational interface module is configured to control at least one of ambient lighting, interior lighting, and an audio system to direct focus of the occupant to a certain point or area of interest.

8. The assisted driving system of claim 7, wherein the certain point or the area of interest refers to a display or an area forward of the host vehicle.

9. The assisted driving system of claim 7, wherein the multimodal conversational interface module is configured to control illumination of a plurality of light bars in an interior of the host vehicle to direct the occupant to the certain point or area of interest.

10. The assisted driving system of claim 1, wherein the multimodal conversational interface module is configured to redirect focus of the occupant to a center of a road ahead of the host vehicle and reengage assisted driving.

11. The assisted driving system of claim 1, wherein the multimodal conversational interface module is configured to display a spatial constellation related to decision making on a display.

12. The assisted driving system of claim 1, wherein the multimodal conversational interface module is configured to generate reactive and proactive messages for the occupant, the reactive and proactive messages being context based and domain specific.

13. The assisted driving system of claim 1, wherein the multimodal conversational interface module is configured to answer questions from the occupant regarding the assisted driving mode.

14. The assisted driving system of claim 1, wherein the in-context active learning module is configured to update a personal profile of the occupant, wherein the adaptive alert module is configured to adaptively generate alerts based on the personal profile.

15. An assisted driving system of a host vehicle, the assisted driving system comprising:

an adaptive alert module configured to adaptively generate alerts having variable duration and intensity;

a multimodal conversational interface module configured to implement a large language model to have a conversation with an occupant of the host vehicle using a plurality of modalities; and an assisted driving module configured to operate in an assisted driving mode, and while in the assisted driving mode, perform a plurality of precondition checks to enable at least one of i) the adaptive alert module to operate in an adaptive alert mode and provide the alerts via a human machine interface (HMI) of the host vehicle, and ii) the multimodal conversational interface module to perform a multimodal conversation with the occupant via the HMI, wherein the multimodal conversational interface module is configured to i) receive explicit feedback and detect implicit feedback from the occupant regarding the alerts, and ii) generate rewards based on the explicit feedback and the implicit feedback, and the adaptive alert module configured to change an alert strategy for the occupant based on the rewards.

16. An assisted driving method for a host vehicle, the method comprising:

operating in an assisted driving mode;

while operating in the assisted driving mode, perform a plurality of precondition checks to enable an adaptive alert mode and to enable a multimodal conversation with an occupant of the host vehicle, during the adaptive alert mode, adaptively generating alerts having variable duration and intensity and providing the alerts via a human machine interface (HMI) of the host vehicle, and during the multimodal conversation, implementing a large language model to have a conversation with the occupant using a plurality of modalities via the HMI; and providing the alerts using selectively the plurality of modalities based on a personal profile of the occupant.

17. The assisted driving method of claim 16, further comprising controlling, via a control module of the host vehicle, steering, acceleration and deceleration of the host vehicle while operating in the assisted driving mode.

18. The assisted driving method of claim 16, further comprising:

fine tuning the large language model based on preferences of the occupant; and changing an alert strategy including changing duration and intensity of one or more of the alerts for the occupant based on the finely tuned large language model and a plurality of parameters.

* * * * *